US009977283B2

(12) United States Patent
Liu

(10) Patent No.: US 9,977,283 B2
(45) Date of Patent: May 22, 2018

(54) BACKLIGHT MODULE AND DISPLAY DEVICE

(71) Applicant: BOE TECHNOLOGY GROUP CO., LTD., Beijing (CN)

(72) Inventor: Qing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/541,903

(22) PCT Filed: Jan. 6, 2017

(86) PCT No.: PCT/CN2017/070440
§ 371 (c)(1),
(2) Date: Jul. 6, 2017

(87) PCT Pub. No.: WO2017/177732
PCT Pub. Date: Oct. 19, 2017

(65) Prior Publication Data
US 2018/0046030 A1 Feb. 15, 2018

(30) Foreign Application Priority Data

Apr. 13, 2016 (CN) .......................... 2016 1 0227299

(51) Int. Cl.
G09F 13/04 (2006.01)
G02F 1/1335 (2006.01)
F21V 8/00 (2006.01)

(52) U.S. Cl.
CPC ..... *G02F 1/133608* (2013.01); *G02B 6/0068* (2013.01); *G02F 1/133514* (2013.01)

(58) Field of Classification Search
CPC ............ G02F 1/1335; G02F 1/133514; G02F 1/133608; G02F 1/133609;
(Continued)

(56) References Cited

U.S. PATENT DOCUMENTS 5,506,929 A * 4/1996 Tai ............................ F21V 5/02
385/146
9,354,465 B2 * 5/2016 Guo .................. G02F 1/133514
(Continued)

FOREIGN PATENT DOCUMENTS

CN 203069818 U 7/2013
CN 203190212 U 9/2013
(Continued)

OTHER PUBLICATIONS

Search Report for International Application No. PCT/CN2017/070440 dated Apr. 6, 2017.

*Primary Examiner* — Ali Alavi
(74) *Attorney, Agent, or Firm* — Calfee, Halter & Griswold LLP

(57) ABSTRACT

A backlight module includes a light guide plate; a first light source arranged along a first side of the light guide plate; a plurality of second light sources arranged along at least one of the two sides perpendicular to the first side, wherein the plurality of second light sources have different color temperatures, and values of the color temperatures of the second light sources at different positions are determined according to the light absorption characteristics of the light guide plate so as to compensate for the light absorbed by the light guide plate corresponding to the color temperature of the second light source.

18 Claims, 3 Drawing Sheets

(58) Field of Classification Search
CPC ......... G02F 1/133611; G02F 1/133603; G02B 6/0068; G02B 6/0073
See application file for complete search history.

(56) References Cited

U.S. PATENT DOCUMENTS

| | | | |
|---|---|---|---|
| 9,435,938 B2 | 9/2016 | Yamashita et al. | |
| 9,507,177 B2 | 11/2016 | Lee et al. | |
| 9,541,695 B2* | 1/2017 | Kim | G02B 6/0023 |
| 9,817,264 B2* | 11/2017 | Li | G02F 1/133516 |
| 9,851,601 B2* | 12/2017 | Guo | G02F 1/133516 |
| 2013/0093985 A1* | 4/2013 | Kang | G02F 1/133377 |
| | | | 349/106 |
| 2015/0078033 A1 | 3/2015 | Lee et al. | |
| 2015/0226911 A1 | 8/2015 | Yamashita et al. | |
| 2016/0062023 A1* | 3/2016 | Itoh | G02B 6/0068 |
| | | | 362/608 |
| 2016/0187721 A1* | 6/2016 | Guo | G02F 1/133514 |
| | | | 427/180 |
| 2017/0169749 A1* | 6/2017 | Masuda | G09G 3/2003 |

FOREIGN PATENT DOCUMENTS

| | | |
|---|---|---|
| CN | 104456282 A | 3/2015 |
| CN | 104662358 A | 5/2015 |
| CN | 105700235 A | 6/2016 |
| JP | 2014164834 A | 9/2014 |

\* cited by examiner

BACKLIGHT MODULE AND DISPLAY DEVICE

CROSS REFERENCE

The present application is based upon International Application No. PCT/CN2017/070440, filed on Jan. 6, 2017, which is based upon and claims priority to Chinese Patent Application No. 201610227299.3, filed on Apr. 13, 2016, and the entire contents thereof are incorporated herein by reference.

TECHNICAL FIELD

Embodiments of the present disclosure relate to the field of display technology, in particular, to a backlight module and a display device.

BACKGROUND

With the continuous development of liquid crystal display (LCD) technology, LCD devices, especially color LCD devices are also expanding the scope of application, and the user experience requirements are gradually increased. For example, currently, small and slim liquid LCD devices have become the main trend of development of the LCD devices.

A backlight module is one of the important components of the LCD for providing light for the LCD panel with sufficient brightness and uniformity. At present, an acrylic plate is generally used as a light guide plate for the backlight module. The acrylic plate has a small absorption coefficient, has a relatively small absorption of light propagated therein, and a relatively uniform emission light can be obtained. However, it is well known that the acrylic (e.g., PMMA) plate has a low temperature resistance and a low strength. In order to avoid bending deformation of the light guide plate when the acrylic plate is used as the light guide plate, the acrylic plate of a larger thickness is usually used and a special back plate (such as a metal back plate or a plastic back plate) is required to support the acrylic plate to increase the strength of the light guide plate, which will undoubtedly increase the overall thickness of the backlight module and have negative effect on the miniaturization of the LCD device.

It should be noted that, information disclosed in the above background portion is provided only for better understanding of the background of the present disclosure, and thus it may contain information that does not form the prior art known by those ordinary skilled in the art.

SUMMARY

Embodiments of the present disclosure provide a backlight module and a display device.

According to an embodiment of the present disclosure, there is provided a backlight module including: a light guide plate; a first light source arranged along a first side of the light guide plate; a plurality of second light sources arranged along at least one of two sides perpendicular to the first side, wherein the plurality of second light sources have different color temperatures, and values of the color temperatures of the second light sources at different positions are determined according to light absorption characteristics of the light guide plate so as to compensate for the light absorbed by the light guide plate.

According to another embodiment of the present disclosure, there is further provided a display device including the backlight module according to any one of the above embodiments and a display panel arranged above the backlight light module.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in embodiments of the present disclosure, the following drawings to be used in the description of the embodiments of the present disclosure will be briefly introduced below. Apparently, the drawings in the following description are only provided for further understanding the embodiments of the present disclosure, and are not provided for improperly limiting the present disclosure. In the drawings.

DETAILED DESCRIPTION

Figure 1:
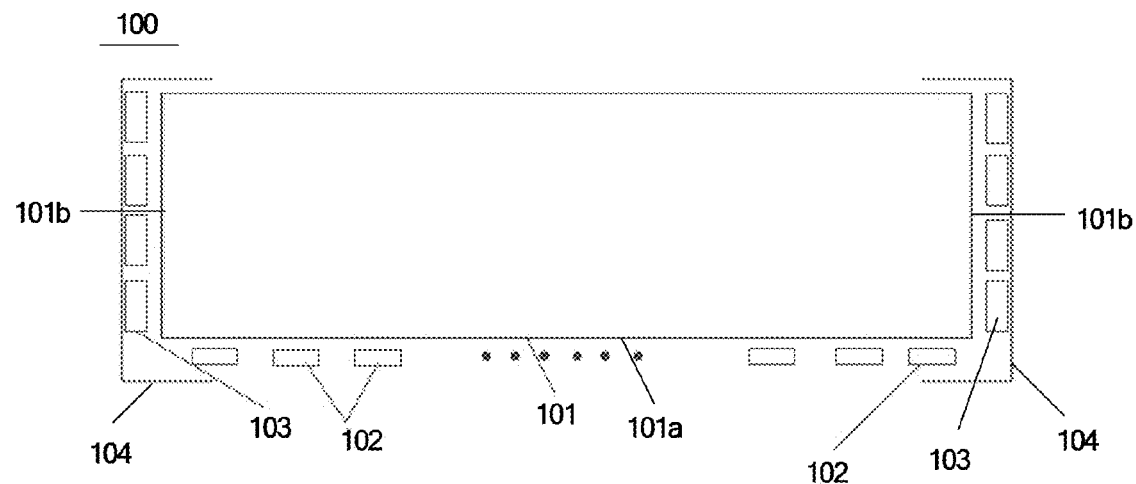
FIG. 1 schematically illustrates a top view of a backlight module according to an embodiment of the present disclosure.

In order to make the objectives, technical solutions and advantages of the present disclosure more clear, the implementations of the present disclosure will be described in further detail in conjunction with the accompanying drawings. It should be appreciated that the described embodiments are part of the embodiments rather than all embodiments of the present disclosure. All other embodiments obtained by one of ordinary skill in the art based on the described embodiments of the present disclosure without the need for creative work are within the protection scope of the present disclosure.

It should be noted that various components and/or regions illustrated in the drawings are not drawn to scale. Moreover, only one or more of the components and/or regions commonly used in such a backlight module or display device are explicitly illustrated or described for ease of explanation in given drawing or embodiment.

A variety of attempts have been made to reduce the thickness of the backlight module, one of which is to use a material having higher strength, such as glass, to fabricate the light guide plate. The light guide plate made of these materials may have a smaller thickness and do not require the use of special back plate to support the light guide plate. However, in practical use, it has been found that the amount of light of a certain component (e.g., blue) of the light exiting from the light guide plate formed by these materials is small, and when the light guide plate is used in display of the display device, a significant color shift phenomenon may occur. This is because these materials have strong absorption effect on the composition of the light incident thereon. Generally, the farther away from the light source, the more serious the absorption becomes, which may seriously affect the uniformity of the outgoing light of the backlight module, thereby affecting the display effect of the display device.

In the embodiments of the present disclosure, there is provided a backlight module and a display device, which may use a light guide plate with high strength and relatively smaller thickness and meanwhile have a relatively uniform backlight, thereby increasing display effect of the display device.

Figure 2:
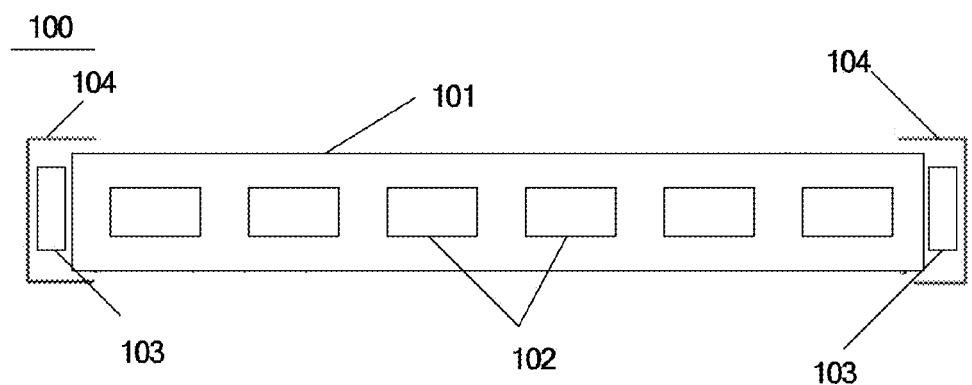
FIG. 2 schematically illustrates a side view of a backlight module according to an embodiment of the present disclosure.

FIG. 1 schematically illustrates a top view of a backlight module 100 according to an embodiment of the present disclosure, and FIG. 2 schematically illustrates a side view of the backlight module 100 according to the embodiment of the present disclosure. According to FIG. 1 and FIG. 2, the backlight module 100 includes a light guide plate 101, a first light source 102 and a plurality of second light sources 103. In the embodiment, the first light source 102 is arranged along a first side 101a of the light guide plate 101, and the plurality of second light sources are arranged along at least one of the two sides 101b perpendicular to the first side 101a. The plurality of second light sources 103 have different color temperatures, and the values of the color temperatures of the second light sources 103 at different positions are determined according to the light absorption characteristics of the light guide plate 101 so as to compensate for the light absorbed by the light guide plate 101. It should be appreciated that the color compensated for by the second light source may correspond to the color temperature of the second light source.

For example, when the material of the light guide plate 101 has a strong absorption to the blue light, generally more blue light may be absorbed as the distance from the first light source 102 increases. Accordingly, the second light sources 103 may be arranged such that a color temperature at a position further away from the first light source 102 (i.e., the first side 101a) is larger than the color temperature at a position closer to the first light source 102. Accordingly, the color of the light exiting from the light guide plate has a relatively uniform color, thereby preventing the color shift phenomenon due to the absorption of the blue light.

As described above, according to the backlight module of the embodiments of the present disclosure, the second light sources having different color temperatures are further provided at the side of the light guide plate so as to compensate for the light absorbed by the light guide plate when the light emitted from the first light source propagates in the light guide plate, thereby obtaining relatively uniform emission of light, and preventing significant color shift phenomenon. In addition, since the second light source is capable of compensating for the absorbed light of the first light source, it is possible to use a material (e.g., glass) with a light-absorbing property but having a high strength as the light guide plate, thereby reducing the thickness of the backlight module.

In an optional embodiment, the first side 101a of the light guide plate 101 may be a long side of the light guide plate 101. That is, the first light source 102 is arranged along the long side of the light guide plate 101. Correspondingly, the second light sources 103 are arranged along a short side of the light guide plate 101. Further optionally, the second light sources 103 may be arranged on both of the short sides of the light guide plate 101, so as to compensate for the light absorption of the light emitted from the first light source 102 by the light guide plate from both sides of the light guide plate, thereby obtaining a more uniform exiting light.

In an exemplary embodiment, the first light source and the second light source may be selected from one or more of a light emitting diode (LED), a cathode fluorescent lamp (CFL), an electroluminescent (EL) sheet and an organic electroluminescent (OEL) sheet.

In an exemplary embodiment, the light guide plate 101 may be a glass light guide plate. Glass has good high temperature resistance and high strength, the use of glass material as a light guide plate does not require the support of the back plate, and it is possible to use the glass with a smaller thickness. Accordingly, it is possible to reduce the thickness of the backlight module. However, since iron ions are contained in the glass, and the iron ions have strong absorption effect on the blue component of the light incident on the glass light guide plate. The farther the distance from the first light source 102 is, the more blue light may be absorbed. According to the color mixing of the three primary colors, the light exiting from the position (the distal light side) far away from the first light source 102 may have a smaller proportion of blue light, and thus the light exiting from the position (the distal light side) far away from the first light source 102 appears to be yellower than the light exiting from the position (the proximal light side) closer to the first light source 102, i.e., has a smaller color temperature. In the embodiments of the present disclosure, in order to avoid the color shift phenomenon due to the absorption of the blue light by the glass light guide plate, the second light sources having different color temperatures can be arranged on the side of the light guide plate, to compensate for the absorbed blue light.

As described above, in the case where glass is used as the light guide plate, more blue light is absorbed by the glass light guide plate as the position become further from the first light source 102. Accordingly, in order to effectively compensate for the absorbed blue light, the second light sources may be arranged such that the color temperature of the second light source becomes larger as the distance from the first side 101a at which the first light source 102 is disposed to the second light source 103 increases. That is, the color temperatures of the second light sources 103 increase as the distance from the first side 101a to the second light sources 103 increases. By using the above configuration of the second light sources 103, more blue light may be compensated for at a position further away from the first light source 102, thereby obtaining a more uniform emission of light and preventing the significant color shift phenomenon due to the absorption of the blue light by the glass light guide plate.

Figure 3:
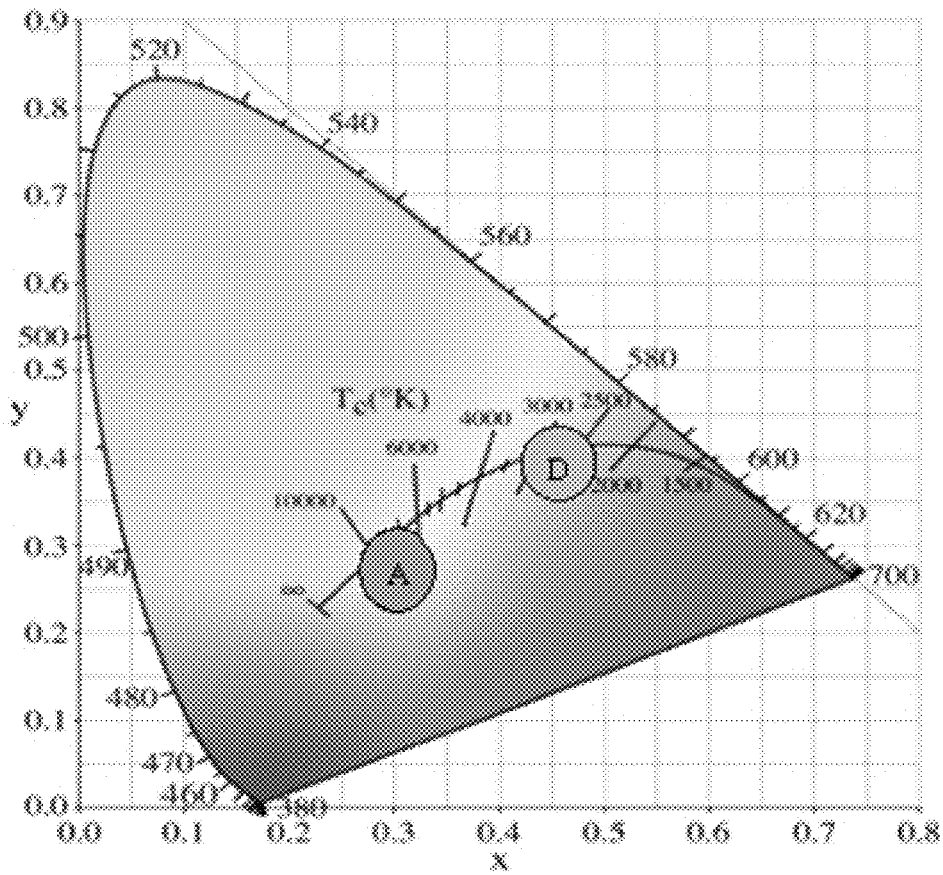
FIG. 3 schematically illustrates a relation between a color temperature and a chromatically coordinate in a chromaticity diagram.

FIG. 3 schematically illustrates a relation between a color temperature and a chromatically coordinate in a chromaticity diagram. The chromaticity diagram is a plan view of various colors at different points. The chromaticity diagram is developed by the International Commission on Illumination (Commission Internationale de L'Eclairage, CIE) in 1931, and thus is referred to as the CIE chromaticity diagram. The CIE chromaticity diagram has a great practical value, any color whether it is an illuminant color or a surface color, may be calibrated in the chromaticity diagram. In this way, the description of the colors may be simple and accurate, and the synthesis paths of light of various colors may be apparent. Thus, in the embodiments of the present disclosure, the color temperature may be determined according to the chromatically coordinate in the chromaticity diagram.

Figure 4:
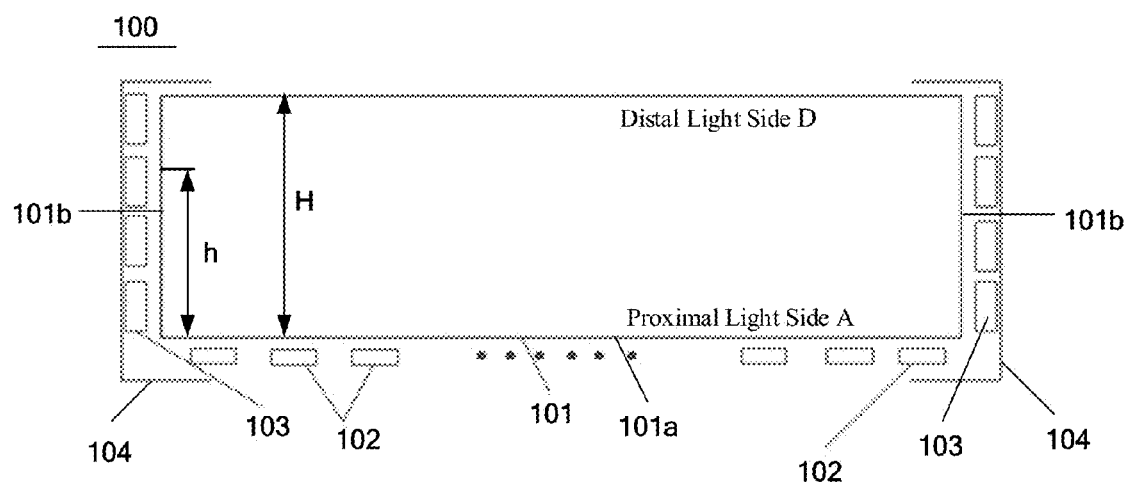
FIG. 4 schematically illustrates a top view of a backlight module, in which a proximal light side A, a distal light side D and distances H and h are marked, according to an embodiment of the present disclosure.

As illustrated in FIG. 4, the side where the first side of the light guide plate is positioned is referred to as a proximal light side A, and the side away from and opposite to the first side of the light guide plate is referred to as a distal light side D. A distance between the proximal light side A and the distal light side D is indicated by H. According to the law of light absorption, it may be determined that:

$$L(B)_D = L(B)_A * e^{-k*H},$$

in the above equation, $L(B)_A$ and $L(B)_D$ are brightness of blue light at the proximal light side A and the distal light side D, respectively, and k is the absorption coefficient of the light guide plate to blue light.

According to the brightness ratio of mixing the three primary colors into white light, i.e., $L(R):L(G):L(B)=1:4.6:0.06$, it is derivable that $L(R)_A = 1/0.06 * L(B)_A$ and $L(G)_A = 4.6/0.06 * L(B)_A$, wherein $L(R)$, $L(G)$ and $L(B)$ are brightness of red light, green light and blue light, respectively, and the brightness of red light and blue light at the distal light side D are respectively:

$$L(R)_D = 1/0.06 * L(B)_A * e^{-k*h}, \text{ and}$$

$$L(G)_D = 4.6/0.06 * L(B)_A * e^{-k*h}.$$

The chromatically coordinates thereof may be represented as:

$$x = \frac{0.49r + 0.31g + 0.2b}{0.67r + 1.13g + 1.2b}, \text{ and } y = \frac{0.18r + 0.31g + 0.01b}{0.67r + 1.13g + 1.2b},$$

wherein r, g and b are three-color coordinates under RGB system, which may be represented as:

$$r = \int L(R) * \bar{r}(\lambda) * d\lambda,$$

$$g = \int L(G) * \bar{g}(\lambda) * d\lambda, \text{ and}$$

$$b = \int L(B) * \bar{b}(\lambda) * d\lambda,$$

wherein $\bar{r}(\lambda)$, $\bar{g}(\lambda)$ and $\bar{b}(\lambda)$ are spectral tristimulus values.

Based on the above equations, the chromaticity coordinate at the distal light side D may be represented as:

$$x_H = \frac{0.49 \int \frac{1}{0.06} * L(B)_A * e^{-k*H} * \bar{r}(\lambda) d\lambda + 0.31 \int \frac{4.6}{0.06} * L(B)_A * e^{-k*H} * \bar{g}(\lambda) d\lambda + 0.2 \int L(B)_A * e^{-k*H} * \bar{b}(\lambda) d\lambda}{0.67 \int \frac{1}{0.06} * L(B)_A * e^{-k*H} * \bar{r}(\lambda) d\lambda + 1.13 \int \frac{4.6}{0.06} * L(B)_A * e^{-k*H} * \bar{g}(\lambda) d\lambda + 1.2 \int L(B)_A * e^{-k*H} * \bar{b}(\lambda) d\lambda}$$

$$y_H = \frac{0.18 \int \frac{1}{0.06} * L(B)_A * e^{-k*H} * \bar{r}(\lambda) d\lambda + 0.31 \int \frac{4.6}{0.06} * L(B)_A * e^{-k*H} * \bar{g}(\lambda) d\lambda + 0.01 \int L(B)_A * e^{-k*H} * \bar{b}(\lambda) d\lambda}{0.67 \int \frac{1}{0.06} * L(B)_A * e^{-k*H} * \bar{r}(\lambda) d\lambda + 1.13 \int \frac{4.6}{0.06} * L(B)_A * e^{-k*H} * \bar{g}(\lambda) d\lambda + 1.2 \int L(B)_A * e^{-k*H} * \bar{b}(\lambda) d\lambda}$$

Similarly, the chromaticity coordinate at a distance h from the first side of the light guide plate is derivable as:

$$x_h = \frac{0.49 \int \frac{1}{0.06} * L(B)_A * e^{-k*h} * \bar{r}(\lambda) d\lambda + 0.31 \int \frac{4.6}{0.06} * L(B)_A * e^{-k*h} * \bar{g}(\lambda) d\lambda + 0.2 \int L(B)_A * e^{-k*h} * \bar{b}(\lambda) d\lambda}{0.67 \int \frac{1}{0.06} * L(B)_A * e^{-k*h} * \bar{r}(\lambda) d\lambda + 1.13 \int \frac{4.6}{0.06} * L(B)_A * e^{-k*h} * \bar{g}(\lambda) d\lambda + 1.2 \int L(B)_A * e^{-k*h} * \bar{b}(\lambda) d\lambda}$$

$$y_h = \frac{0.18 \int \frac{1}{0.06} * L(B)_A * e^{-k*h} * \bar{r}(\lambda) d\lambda + 0.31 \int \frac{4.6}{0.06} * L(B)_A * e^{-k*h} * \bar{g}(\lambda) d\lambda + 0.01 \int L(B)_A * e^{-k*h} * \bar{b}(\lambda) d\lambda}{0.67 \int \frac{1}{0.06} * L(B)_A * e^{-k*h} * \bar{r}(\lambda) d\lambda + 1.13 \int \frac{4.6}{0.06} * L(B)_A * e^{-k*h} * \bar{g}(\lambda) d\lambda + 1.2 \int L(B)_A * e^{-k*h} * \bar{b}(\lambda) d\lambda}$$

In an embodiment of the present disclosure, it is possible to select a second light source having an appropriate color temperature and dispose the second light source at a corresponding position of the light guide plate based on the above equation of the chromaticity coordinates at the distance h.

In an embodiment of the present disclosure, by providing the second light source according to the above chromaticity coordinates, the second light source may more effectively compensate for the light of the color absorbed by the light guide plate corresponding to the color temperature of the second light source, to obtain uniform emission of light.

It should be noted that in the above embodiment, the compensation of the blue light absorbed by the light guide plate using the second light source is described in detail, while it may be appreciated that the light of other colors (e.g., the red light and the green light) absorbed by the light guide plate may be compensated for according to similar schemes.

In an embodiment of the present disclosure, it should be appreciated that the first light source may include a line light source arranged at the first side, or may include a plurality of sub light sources arranged at equal intervals along the first side of the light guide plate. Correspondingly, the plurality of second light sources may be arranged at equal intervals along one side or both of the sides perpendicular to the first side. Apparently, other embodiments are also possible.

As illustrated in FIG. 1 and FIG. 2, the backlight module according to the embodiments of the present disclosure may further includes a frame 104, such that relative positions between the first light source, the second light source and the light guide plate may be fixed.

It should be noted that the backlight module according to the embodiments of the present disclosure may further include other optical films such as a reinforcing sheet, a diffuser, a reflective sheet, or the like.

Figure 5:
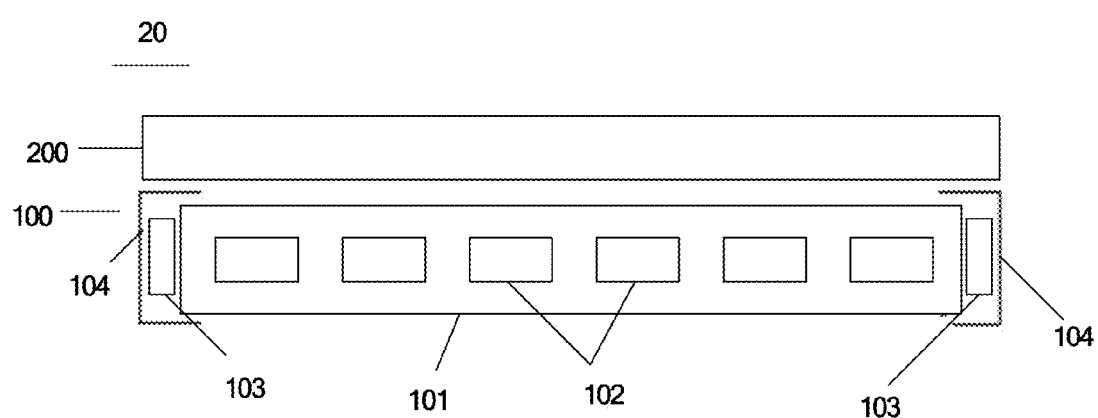
FIG. 5 schematically illustrates a side view of a display device according to an embodiment of the present disclosure.

FIG. 5 schematically illustrates a side view of a display device according to an embodiment of the present disclosure. The display device 20 includes the backlight module 100 according to the above embodiments and a display panel 200. In the embodiment, the display panel 200 is disposed over the backlight module 100. The display device according to the present embodiment may have uniform emission of light by using the above backlight module and reduce the color shift phenomenon due to the light absorption of the light guide plate, thereby improving display effect.

In one embodiment, the display panel 200 may include a lower polarizing sheet, a TFT array substrate, a liquid crystal layer, a color filter, an upper polarizing sheet, and the like. The display panel provided by the present disclosure is applicable in any product or component having a display function such as a mobile phone, a tablet computer, a television set, a notebook computer, a digital camera or a navigator.

It is to be noted that, in the description of the present disclosure, the orientations or positional relationships indicated by terms "upper", "above", "lower", "under", "top", "bottom" and "between" are orientations or positional relationships as shown in the drawings, which is only for the purpose of facilitating describing the description and simplifying the description, but is not intended or implied that the device or element referred to must have a specific orientation, and be constructed and operated in a particular orientation. Therefore, it should not be understood as a limitation of the present disclosure. For example, when an element or a layer is referred to as being "on" another element or layer, it may be directly on the other element or layer, or an intermediate element or layer may exist; likewise, when an element or a layer is referred to as "below" another element or layer, it may be directly under the other element or layer, or at least one intermediate element or layer may exist; when an element or a layer is referred to as being "between" two elements or two layers, it may be a unique element or layer between the two elements or two layers, or more than one intermediate element or layer may exist.

In addition, it should also be noted that, when elements of the present application and its embodiments are introduced, articles "a", "an", "that" and "the" are intended to indicate the presence of one or more elements. In the description of the present disclosure, the meaning of "a plurality of" is two or more, unless otherwise specified. The terms "comprise", "include", "contain", and "have" are intended to be inclusive and to indicate that additional elements other than the listed elements may exist. The terms "first", "second" are only for the purpose of description and are not to be construed as indicating or implicit relative importance.

The foregoing is merely preferred embodiments of the present disclosure and is not intended to limit the present disclosure. Any modifications, equivalent substitutions, improvements, and the like within the spirit and principle of the present disclosure are intended to be encompassed by the protection scope of the present disclosure.

What is claimed is:

1. A backlight module comprising:
a light guide plate;
a first light source arranged along a first side of the light guide plate;
a plurality of second light sources arranged along at least one of the two sides perpendicular to the first side,
wherein the plurality of second light sources have different color temperatures, and values of the color temperatures of the second light sources at different positions are determined according to light absorption characteristics of the light guide plate so as to compensate for the light absorbed by the light guide plate.

2. The backlight module according to claim 1, wherein the light guide plate is a glass light guide plate.

3. The backlight module according to claim 2, wherein the color temperature of the second light source increases as a distance from the second light source to the first side increases.

4. The backlight module according to claim 3, wherein a chromatically coordinate of the second light source disposed at a distance h to the first side is determined according to the following equations:

$$x_h = \frac{0.49\int \frac{1}{0.06}*L(B)_A*e^{-k*h}*\bar{r}(\lambda)d\lambda + 0.31\int \frac{4.6}{0.06}*L(B)_A*e^{-k*h}*\bar{g}(\lambda)d\lambda + 0.2\int L(B)_A*e^{-k*h}*\bar{b}(\lambda)d\lambda}{0.67\int \frac{1}{0.06}*L(B)_A*e^{-k*h}*\bar{r}(\lambda)d\lambda + 1.13\int \frac{4.6}{0.06}*L(B)_A*e^{-k*h}*\bar{g}(\lambda)d\lambda + 1.2\int L(B)_A*e^{-k*h}*\bar{b}(\lambda)d\lambda}$$

$$y_h = \frac{0.18\int \frac{1}{0.06}*L(B)_A*e^{-k*h}*\bar{r}(\lambda)d\lambda + 0.31\int \frac{4.6}{0.06}*L(B)_A*e^{-k*h}*\bar{g}(\lambda)d\lambda + 0.01\int L(B)_A*e^{-k*h}*\bar{b}(\lambda)d\lambda}{0.67\int \frac{1}{0.06}*L(B)_A*e^{-k*h}*\bar{r}(\lambda)d\lambda + 1.13\int \frac{4.6}{0.06}*L(B)_A*e^{-k*h}*\bar{g}(\lambda)d\lambda + 1.2\int L(B)_A*e^{-k*h}*\bar{b}(\lambda)d\lambda}$$

wherein the chromatically coordinate indicates the color temperature of the second light source;
$L(B)_A$ is a brightness of blue light at the first side;
$k$ is an absorption coefficient of the light guide plate to blue light; and
$\bar{r}(\lambda)$, $\bar{g}(\lambda)$ and $\bar{b}(\lambda)$ are spectral tristimulus values.

5. The backlight module according to claim 1, wherein the first light source comprises a plurality of sub light sources arranged at equal intervals along the first side of the light guide plate.

6. The backlight module according to claim 1, wherein the plurality of second light sources are arranged at equal intervals along at least one of the two sides perpendicular to the first side.

7. The backlight module according to claim 1, wherein the first light source and the second light source comprise one or more of a light emitting diode (LED), a cathode fluorescent lamp (CFL), an electroluminescent (EL) sheet and an organic electroluminescent (OEL) sheet.

8. The backlight module according to claim 1, wherein the first side is one of a long side or a short side of the light guide plate.

9. The backlight module according to claim 1, further comprises a frame, and at least one of the first light source, the second light source and the light guide plate is attached to the frame.

10. A display device comprising a backlight module and a display panel arranged above the backlight light module, wherein the backlight module comprises:
a light guide plate;
a first light source arranged along a first side of the light guide plate;
a plurality of second light sources arranged along at least one of the two sides perpendicular to the first side,
wherein the plurality of second light sources have different color temperatures, and values of the color temperatures of the second light sources at different positions are determined according to light absorption characteristics of the light guide plate so as to compensate for the light absorbed by the light guide plate.

11. The display device according to claim 10, wherein the light guide plate is a glass light guide plate.

12. The display device according to claim 11, wherein the color temperature of the second light source increases as a distance from the second light source to the first side increases.

13. The display device according to claim 12, wherein a chromatically coordinate of the second light source disposed at a distance h to the first side is determined according to the following equations:
- wherein the chromatically coordinate indicates the color temperature of the second light source;
- is a brightness of blue light at the first side;
- is an absorption coefficient of the light guide plate to blue light; and
- are spectral tristimulus values.

14. The display device according to claim 10, wherein the first light source comprises a plurality of sub light sources arranged at equal intervals along the first side of the light guide plate.

15. The display device according to claim 10, wherein the plurality of second light sources are arranged at equal intervals along at least one of the two sides perpendicular to the first side.

16. The display device according to claim 10, wherein the first light source and the second light source comprise one or more of a light emitting diode (LED), a cathode fluorescent lamp (CFL), an electroluminescent (EL) sheet and an organic electroluminescent (OEL) sheet.

17. The display device according to claim 10, wherein the first side is one of a long side or a short side of the light guide plate.

18. The display device according to claim 10, wherein the backlight module further comprises a frame, and at least one of the first light source, the second light source and the light guide plate is attached to the frame.

* * * * *